United States Patent [19]

Shih

[11] Patent Number: 5,110,088

[45] Date of Patent: May 5, 1992

[54] WATER-CONTROL STOPPER

[76] Inventor: Sen-Tien Shih, No. 18, Lane 70, I Ya Alley, I Hsing Tsun, Hsiu Shui Hsiang, Changhua Hsien, Taiwan

[21] Appl. No.: 668,765

[22] Filed: Mar. 13, 1991

[51] Int. Cl.⁵ .............................................. F16L 29/02
[52] U.S. Cl. .................................. 251/149.1; 251/319; 137/329.2
[58] Field of Search ............ 251/324, 325, 149, 149.1, 251/319, 320, 339, 318; 137/329.1

[56]  References Cited

U.S. PATENT DOCUMENTS 4,036,467  7/1977  Dalton ............................ 251/319 X
4,213,021  7/1980  Alexander ....................... 137/540 X

FOREIGN PATENT DOCUMENTS 689508  6/1964  Canada .......................... 251/149.1 X Primary Examiner—Martin P. Schwadron
Assistant Examiner—Kevin L. Lee
Attorney, Agent, or Firm—Bacon & Thomas

[57]  ABSTRACT

A water-control stopper comprises a stopper body (30), an I-shaped valve (32), an actuator tube (52) and a nut (31). It is characterized in a simple structural framework which can be manufactured easily at a relatively low cost and may utilize either a rigid tube or a soft tube.

4 Claims, 1 Drawing Sheet

WATER-CONTROL STOPPER

The invention relates to the water pipe of bathroom facilities, and more particularly to a water-control stopper.

A water-control stopper is generally installed under a lavatory or a toilet. The T-shaped stopper is used to control the inlet water supply. However, the T-shaped stopper must be shut off when the repair work of the water faucet of a lavatory or of the toilet is under way. In addition, the complex make-up of the water-control stopper is responsible for its unjustifiably high production cost.

The primary object of the invention is to provide the water faucet of a lavatory or the water tank of a toilet with a water-control stopper which can be shut off easily.

It is another object of the invention to provide the water faucet of a lavatory or the water tank of a toilet with a water-control stopper, which is structurally simple and can be made at a low cost.

According to the invention there is provided a water-control stopper comprising mainly a stopper body, an I-shaped valve, and a nut.

By way of example, a specific embodiment in accordance with the invention will be described with reference to the accompanying drawings in which.

Figure 1:
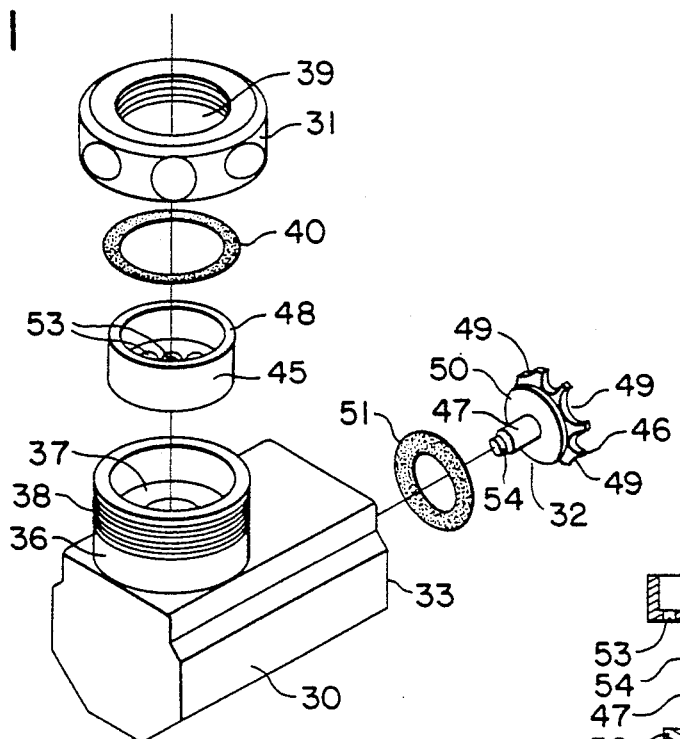
FIG. 1 is an exploded perspective view of this invention.

Referring to FIGS. 1-4, the water control stopper embodied in the present invention is shown comprising a stopper body 30, a nut 31, and an I-shaped valve 32. The stopper body 30 is of an L-shaped construction. The stopper body 30 has a horizontal end 33 with a screw thread 34 disposed therein for coupling with the water pipe 35 embedded in the wall. The stopper body 30 has a longitudinal section 36 having a stepped hole 37 disposed therein and having a screw thread 38 disposed on the outer surface thereof for engagement with a nut 31 having a through hole 39 located at the center thereof. A washer 40 is lodged in the nut 31. The stepped hole 37 has an inner lateral hole 41 connecting with a larger hole 43 on an inclined plane 42 so as to permit the larger hole 43 to communicate with the horizontal end 33. The I-shaped valve 32 is housed in the stepped hole 37 and is capable of moving between the inner and the outer lateral holes 41 and 44. The I-shaped valve 32 comprises an upper face plate 45 and a water stopping piece 46, which are both fastened together by means of a center rod 47. The diameter of the upper face plate 45 is greater than that of the inner lateral hole 41 and has a plurality of holes 53 disposed therein. Each of the holes 53 communicates with inner lateral hole 41. Upper face plate 45 has a flange 48 of an appropriate height extending upwardly from the circumference thereof. The water stopping piece 46 has a plurality of indentations 49 to provide a space between the water stopping piece 46 and the hole 43. The water stopping piece 46 has a clamp piece 50 located near the upper face plate 45 to accommodate a water stopping ring 51.

Figure 3:
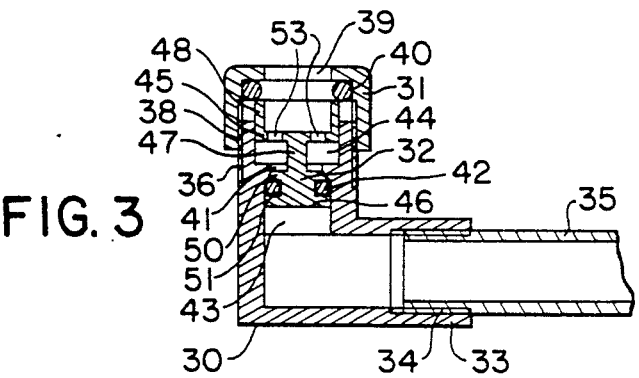
FIG. 3 is a section view of this invention in a shutoff state.
Figure 4:
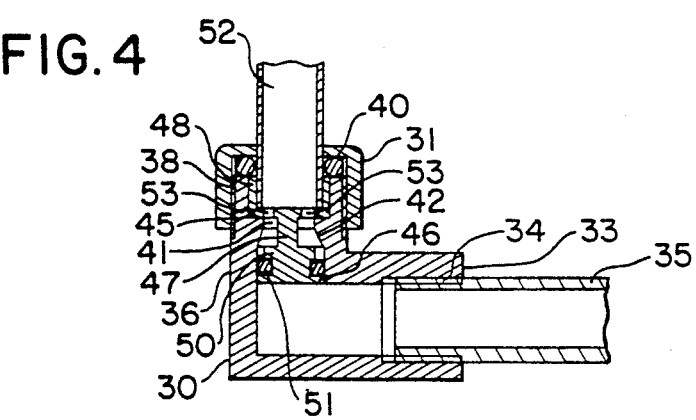
FIG. 4 is a section view of this invention in a turn-on state.

When the stopper body 30 is fastened to the water pipe 35 embedded in the wall at the time when the water supply is turned on, the water stopping piece 46 is forced to move upward by the water pressure. At this time, the nut 31 is not tightened. The flange 48 located at the upper side of the I-shaped valve 32 is exposed beyond the longitudinal section 36, and the water stopping ring 51 makes a close contact with the inclined plane 42 of the inner lateral hole 41, as shown in FIG. 3 illustrative of the embodiment in a shutoff state. An actuator tube 52 traversing the through hole 39 of the nut 31 forces the flange 48 to move into the outer lateral hole 44, resulting in an activation of the I-shaped valve 32 to move downward so that water stopping ring 51 and inclined plane 42 become separated. As a result, the water flows out of the outlet of the tube 52 via the indentations 49, hole 43 and inner lateral hole 41 of the water stopping piece 46 and the hole 53 of the upper face plate 45, as shown in FIG. 4 illustrative of an onset of the water flow. Under an intensive pressure of the nut 31, the washer 40 and the tube 52 make contact with the end of the longitudinal section 36 to prevent water leakage. Furthermore, the embodiment of the present invention is further characterized in that it has a simple structural framework which can be made easily at a relatively low cost and that either a rigid tube or a soft tube is applicable.

Figure 2:
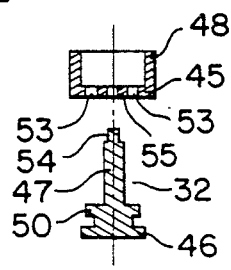
FIG. 2 is a schematic view of the structure of an I-shaped valve of FIG. 1.

In manufacturing the I-shaped valve 32 embodied in the present invention, the upper face plate 45 and water stopping piece 46 are inserted separately into the longitudinal and the horizontal sections 36 and 33 of the stopper body 30 so as to permit the end portion 54 of center rod 47 to become engaged with the center hole 55 of the upper face 45, as shown in FIG. 2. The end portion 54 exposing beyond the upper face plate 45 is enlarged in order to overcome the problem of the upper face plate 45 being larger than the inner lateral hole 41.

It is to be noted that the above description is given by way of example only and not by way of limitation.

I claim:

1. A water control stopper comprising:
   a) a stopper body of L-shaped configuration defined by a longitudinal section having an outer screw thread and a horizontal section having an inner screw thread, the longitudinal section including a stepped hole defined by an inner lateral hole communicating with a larger hole through an inclined plane;
   b) an I-shaped valve disposed in the stepped hole, the valve including an upper face plate having a larger diameter than the diameter of the inner lateral hole, a water stopping piece provided with a plurality of indentations therein, and a center rod connecting the upper face plate to the water stopping piece;
   c) a threaded nut secured on the outer screw thread of the longitudinal section, the nut including a washer and a hole positioned at the center of the nut; and
   d) an actuator tube disposable through the hole in the nut for urging the valve away from the inclined plane and permitting water flow through the indentations of the valve and out the tube.

2. The water control stopper of claim 1 wherein the upper face plate is provided with a plurality of holes therethrough and further including a flange extending upwardly from the outer periphery of the base plate.

3. The water control stopper of claim 2 wherein the flange extends beyond a terminal end of the longitudinal section when the valve is positioned in a shutoff state.

4. The water control stopper of claim 1 wherein the valve further includes a stopping ring disposable in engagement with the inclined plane for positioning the valve in a shutoff state.

* * * * *